United States Patent [19]

Leon

[11] Patent Number: 4,501,519

[45] Date of Patent: Feb. 26, 1985

[54] THREADING DIE COUPLE

[76] Inventor: Harry I. Leon, 924 Bowen St., N.W., Atlanta, Ga. 30318

[21] Appl. No.: 407,459

[22] Filed: Aug. 12, 1982

Related U.S. Application Data

[63] Continuation-in-part of Ser. No. 153,083, May 27, 1980, Pat. No. 4,349,931.

[51] Int. Cl.³ .............................................. B23G 5/04
[52] U.S. Cl. ............................... 408/101; 10/123 P; 269/168; 408/99; 408/138; 408/238
[58] Field of Search ............... 408/239 R, 221, 238, 408/121, 138, 129, 137, 87, 99, 100, 101; 82/31, 33 R; 10/111, 123 R, 123 P, 123 S; 269/204, 258, 249, 287, 296, 43, 208, 209, 257

[56] References Cited

U.S. PATENT DOCUMENTS

| 66,885 | 7/1867 | Richards | 82/31 |
|---|---|---|---|
| 1,187,109 | 6/1916 | Steurnagel | 269/204 |
| 1,344,700 | 6/1920 | Loomis | 269/258 |
| 1,533,688 | 4/1925 | Bergh | 269/249 |
| 1,878,690 | 9/1932 | Forney | 82/33 R |
| 2,353,009 | 7/1944 | Boyd | 82/33 R |
| 2,845,828 | 8/1958 | Thomeczek | 82/31 |
| 3,704,014 | 11/1972 | Keene | 269/249 |
| 4,349,931 | 9/1982 | Leon | 408/121 X |

*Primary Examiner*—William R. Briggs

*Attorney, Agent, or Firm*—Harry I. Leon

[57] ABSTRACT

A tool couple which is used with a manually-operated threading die to aid in cutting the initial threads on a pipe or bolt. The device is used to force the anterior cutting edge of the die firmly against the outer, unthreaded surface of the workpiece at the outset of a threading operation. The die is kept wedged, as the initial threads are being cut, between the workpiece and a rotatable member of the tool couple so that the die cannot slip backward toward and merely chamfer the leading edge of the workpiece. To keep the die so wedged, the rotatable member is advanced by means of a shaft in the direction of the end of the workpiece at approximately the same rate as the die is moved along the longitudinal axis of the workpiece. Usually only one revolution of the threading die, assisted by the tool couple, is required to establish the starting thread. The rotatable member, which dissipates torque developed during the threading operation, is retained in general alignment with the die by a protrusion in the shape of a shallow truncated cone on the face of the member which is adapted to extend a short distance into the central passageway of the die. A frame supporting the shaft can be swung out of the way once sufficient threads have been cut on the workpiece to hold the threading die in place.

10 Claims, 6 Drawing Figures

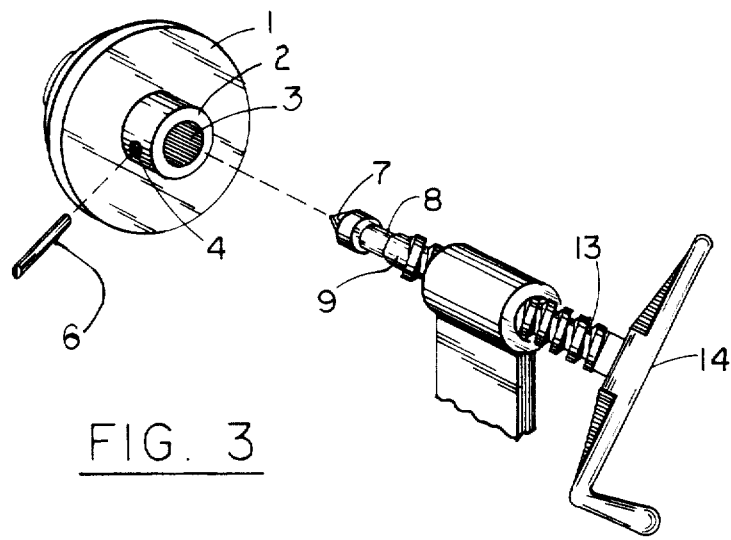
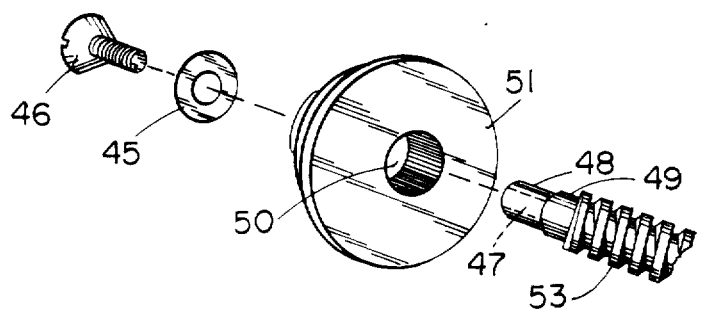
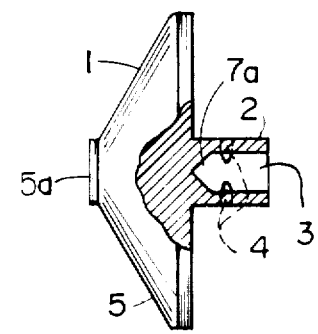
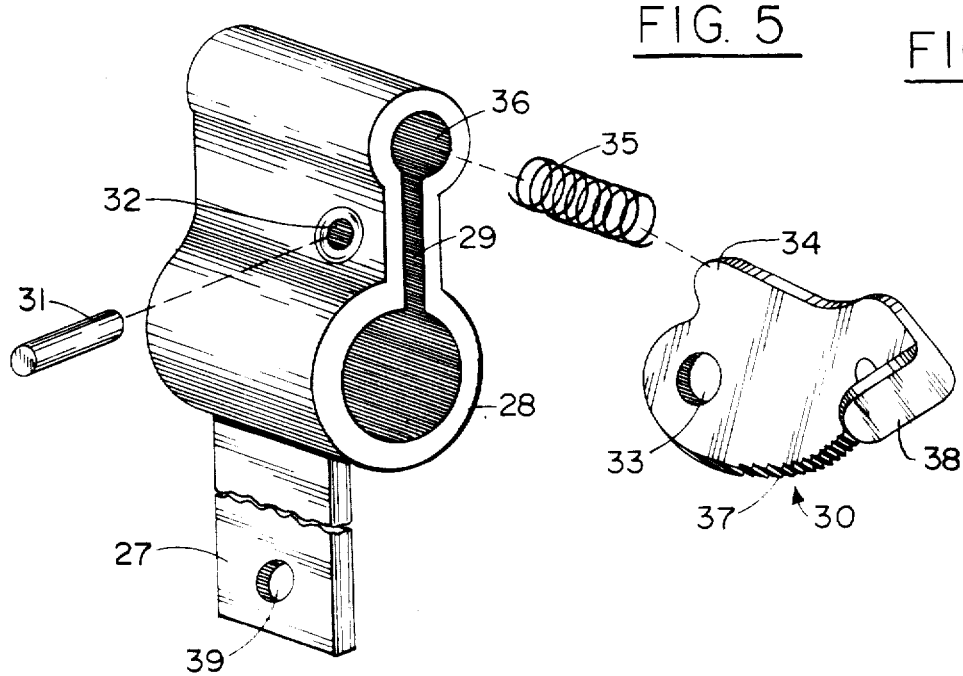

THREADING DIE COUPLE

CROSS-REFERENCE TO RELATED APPLICATION

This application is a continuation-in-part of application Ser. No. 153,083, filed May 27, 1980, now U.S. Pat. No. 4,349,931.

BACKGROUND OF THE INVENTION

1. Field of the Invention

This invention relates to tool couple elements and in particular to those attached to a vise or to a cylindrical workpiece for holding a threading die in contact with the workpiece while the die is used to form the initial threads thereon.

2. Description of the Prior Art

The cutting of the initial thread on a pipe in a manual operation requires the operator to push the die onto the pipe while simultaneously turning the die handle. This operation is at times a very difficult and awkward task because a large amount of pressure must, on occasion, be exerted on the die against the pipe in order to cut the initial threads. As a consequence, only persons of superior strength are capable of threading pipe.

Typically, difficulties are experienced in forming the starting thread when the pipe lacks close tolerance in roundness. Such out-of-roundness may be caused by the techniques employed in its manufacture, by rough handling, or by deformation of the pipe end as it is being cut. Usually, if the initial attempt to form a thread is unsuccessful, the operator finds that successive attempts also fail; the die merely continues to cut a steep chamfer or bevel on the leading edge of the pipe.

To remedy such a situation, those operators fortunate enough to have a grinding wheel close at hand fashion a slight taper on the outer surface of the pipe so that the cutting edges behind the anterior cutting edge of the die, as well as the latter edge, are engaged in the initial cutting action. However, the operation of shaping a taper is time-consuming and often impractical.

Too frequently, frustrated operators resort to hammering a die onto the end of a pipe in order to start the die. Such hammering usually destroys an expensive tool, the threading die.

The awkwardness of the process of trying to press the die against the pipe and to rotate the die handle simultaneously is further compounded when one attempts to thread the end of an installed pipe. In the past, most operators have elected to wrench out the section of pipe which must be cut and re-threaded. The pipe-fitting activity associated with removing such a section of pipe can be time-consuming and costly, especially when the joint connecting the section to other pipe is relatively inaccessible.

In my patent identified above, there has been disclosed a tool couple for pushing a threading die onto the unthreaded outer surface of a cylindrical workpiece without damaging the cutting edges of the die and for subsequently maintaining sufficient force on the die to prevent it from slipping as it is turned to cut the initial threads in the workpiece. This tool couple comprises a frame with an elongated arm and a shaft supported thereby for moving a rotatable member in a direction parallel to the longitudinal axis of the elongated arm. The face of the rotatable member which is adapted for physical contact with the threading die has a generally flat surface. With this rotatable member, care must be taken in aligning the tool couple and the workpiece to prevent the rotatable member from moving sideways as it is being turned.

SUMMARY OF THE INVENTION

The subject invention is directed to improvements over the applicant's prior teachings by way of providing a rotatable member having a protrusion generally in the shape of a shallow truncated cone on the face thereof which is adapted to contact the threading die. With the tool couple positioned so that this protrusion extends a short distance into the central passageway of the die as the rotatable member pushes against it, much of the shifting of the centerline of the die, caused in part by out-of-roundness of the end of the workpiece, is eliminated. Thus the motion of the die as it is being turned is stabilized. Moreover, with this improved rotatable member, considerable misalignment of the longitudinal axes of the workpiece and of the shaft can be tolerated.

A further improvement is in the means for constraining the rotatable member to slide around the longitudinal axis of the shaft. The rotatable member includes a collar which has a bore that is slightly larger in diameter than is the body of the shaft. At least one hole formed in the collar communicates with the bore so that a portion of a pin inserted in the hole can ride in a groove formed in the shaft, thereby holding it and the rotatable member in assembled relation. Low turning friction between the shaft and the rotatable member can be obtained with this embodiment by providing a pointed tip on the shaft and having the end of this tip ride against a conically-shaped section of the bore. Thus an axial thrust taken by the rotating member is transmitted to the shaft through point contacts only with little friction being generated.

A further alternate embodiment to aid in threading a newly-cut end formed in a section of installed piping is also provided. In this tool couple, the means for anchoring a part thereof in a fixed position relative to a cylindrical workpiece comprises an open-ended, adjustable clamp cylinder to which the part is rigidly attached. A spring cooperates with a cam element from one edge of which teeth protrude and which is rotatably mounted proximate the cylinder. Once an end of a workpiece has been passed into this cylinder, the spring causes the element to move into a position such that the teeth grip the workpiece, thereby preventing any substantial movement of the cylinder toward the end to be threaded. A means for opposing the bias of the spring is also provided to allow for removal of the workpiece.

In addition, there is disclosed an improvement for the structure of the frame supporting the shaft. A reduction in the weight of the tool couple is achieved, without sacrificing strength, by utilizing an elongated arm, the cross-section of which resembles an I-beam.

BRIEF DESCRIPTION OF THE DRAWINGS

Further details are explained below with the help of the examples illustrated in the attached drawings in which:

FIG. 3 is an exploded view showing in perspective the rotatable member and a fragmentary section of the same tool couple as in FIG. 1;

FIG. 4 is an enlarged elevational view of the rotatable member of FIG. 1 with a broken out section showing the collar of the rotatable member in cross-section;

FIG. 5 is an exploded view showing in perspective a modified rotatable member and a fragmentary portion of the shaft of a further embodiment of the present invention; and FIG. 6 is an exploded view on an enlarged scale showing in perspective the base of the embodiment of the present invention shown in FIG. 2.

DESCRIPTION OF THE PREFERRED EMBODIMENT

Figure 1:
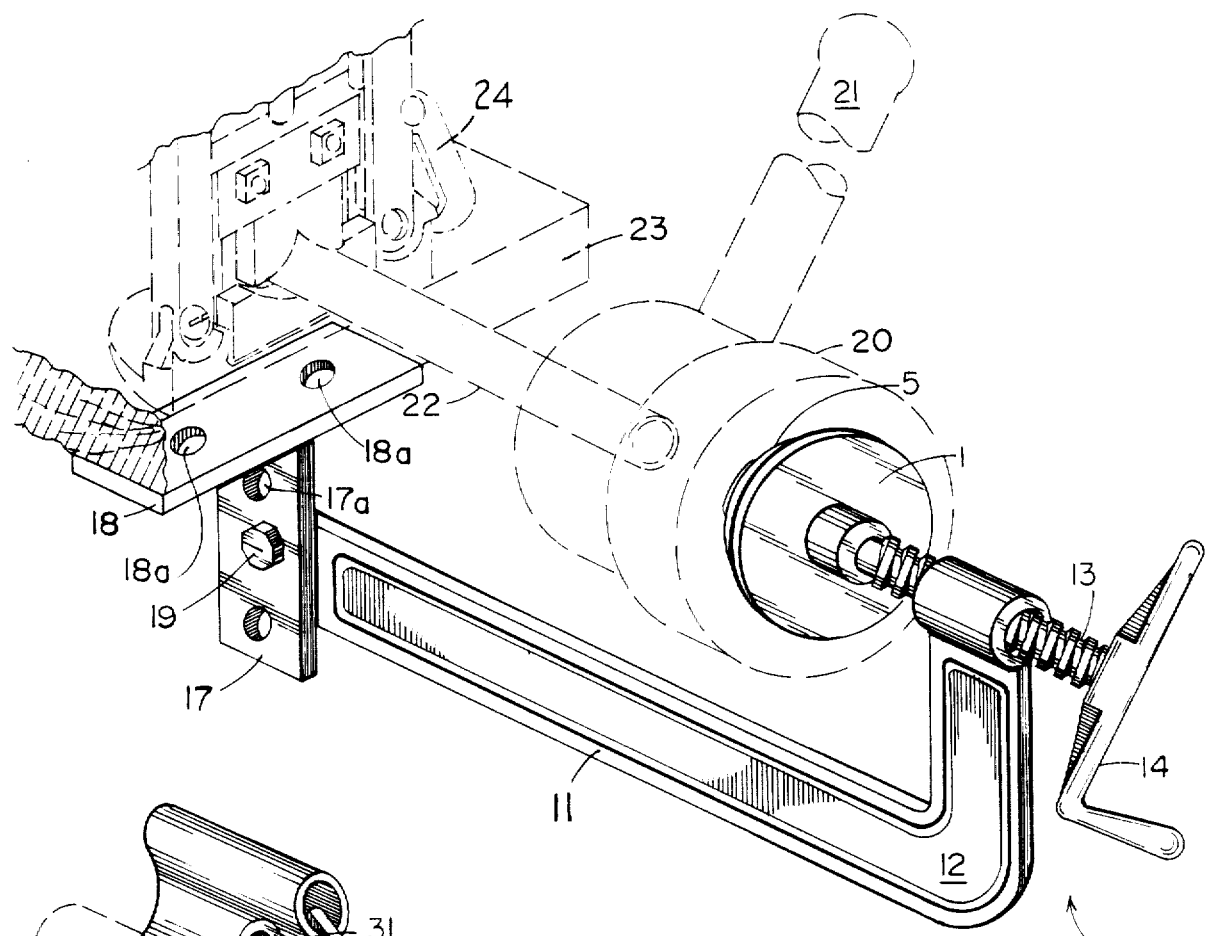
FIG. 1 is a perspective view of one embodiment of the present invention in which the tool couple is bolted to the underside of a work bench beneath a pipe vise, the tool couple being applied in a position to force the cutting edges of a threading die against the outer surface of a workpiece to be threaded.

In the drawings, a tool couple 10 incorporating the present invention is shown holding a threading die 20 in contact with a workpiece such as a pipe 22 (FIG. 1). The portion of the threading die 20 which abuts upon the pipe 22 comprises the cutting edges. The die 20 has been slid over the leading edge of the pipe 22 and along it until the anterior cutting edge begins to scrape its outer surface.

The tool couple 10 comprises a shaft 13 which is threadedly engaged with a frame 12 to form a means for moving a rotatable member 1 in a direction parallel to the longitudinal axis of an elongated arm 11 in the frame. The arm 11 is pivotally connected to a tailpiece 17 which extends generally downwardly from a means for anchoring the tailpiece 17 in a fixed position relative to the pipe 22. In the tool couple 10, the means for anchoring the tailpiece comprises a mounting bracket 18 which is rigidly attached to the tailpiece 17.

To aid in positioning the rotatable member 1 so that the longitudinal axes of the shaft 13 and of the pipe 22 generally coincide for nominal pipe sizes from ⅛th to 2 inches, a plurality of holes 17a disposed along the vertical axis of the tailpiece 17 are provided (FIG. 1). The elongated arm 11 is pivotally connected to the tailpiece 17 by any appropriate means such as a bolt 19 and nut (not shown) using whichever hole 17a provides the best alignment dependent upon the size of the pipe 22. Alignment of the longitudinal axes of the shaft 13 and of the pipe 22 is also dependent upon bolting the mounting bracket 18, using the holes 18a, to the underside of a work bench 23 so that the longitudinal axis of the shaft 13 lies in approximately the same vertical plane as does a line passing vertically between the vise jaws of a pipe vise 24 secured to the upper surface of the bench. Alternately, the tailpiece may be rigidly attached to the body of the pipe vise itself. In the latter embodiment, the longitudinal axes of the shaft and of the workpiece can be readily brought into substantially parallel alignment with each other in approximately the same vertical plane merely by rotating the elongated arm about its pivotal joint with the tailpiece.

In operation, points on the rotatable member 1 are in physical contact with the threading die 20 so that a force applied to a handle 14 which is connected to the shaft 13 can be transmitted through the frame of the threading die 20 to points on the cutting edges which are in contact with the pipe 22. The member 1 rotates at substantially the same rate as the threading die 20 when it is manually turned by means of the die handle 21. An operator can adjust the compressive force necessary to hold the die in position with the tool couple, as the die is being turned, by simultaneously turning the handle 14 to advance the rotatable member 1. Once sufficient threads have been cut on the end of the workpiece to hold the die in place, the operator ceases turning the handle 14; as the threading process is continued, the tool couple is released from the die and falls back out of the way.

The tool couple as thus far described follows the teachings of application Ser. No. 153,083, filed May 27, 1980, now U.S. Pat. No. 4,349,931.

In accordance with the present invention, there is provided improved means for stabilizing the motion of the threading die as it is being turned at the outset of a threading operation. Thus, as shown in FIGS. 1, 3, and 4, there is provided a rotatable member 1 having a protrusion 5 generally in the shape of a frustrum of a cone and having a slightly ridged portion 5a formed on the narrow end thereof. The ridged portion 5a is disposed approximately symmetrically about the axis of rotation of the member 1 and is useful as a visual guide in aligning the tool couple 10 and the workpiece 22 prior to the placement of the die 20 against it. The member 1, like the remainder of the tool couple 10, is preferably formed of a material such as steel, ductile iron, aluminum, or the like.

In the rotatable member 1 of this preferred embodiment which is best illustrated in FIG. 4, the protrusion 5 approximates the frustrum of a right circular cone which is generated by rotating a right triangle having one leg which is approximately one half of the hypotenuse in length about its shorter leg. In other words, the acute angle between the axis of symmetry of this frustrum and a line in the same plane as this axis extending from the points of intersection of this plane with the curved surface of the frustrum is approximately 60°. By having this angle greater than 45°, the axial component of a force applied to the frame of the die with the tool couple exceeds its transverse component, thereby protecting the frame.

The diameter of the ridged portion 5a is less than the smallest dimension of the central passageway of the die 20 near the entrance thereto distal its anterior cutting edge. Accordingly, the tool couple 10 can be positioned so that the protrusion 5 extends a short distance into this central passageway. With the tool couple so positioned, much of the shifting of the centerline of the die as it is being turned, caused in part by out-of-roundness of the end of the workpiece, is eliminated. Usually, with the improved rotatable member 1, only one complete revolution of the die 20 is sufficient to establish the starting thread. Moreover, considerable misalignment of the longitudinal axes of the workpiece and of the shaft 13 can be tolerated because the die 20 itself rubbing against the conical side wall of the rotatable member 1 tends to keep it centered.

Because of the shallow taper of the protrusion 5, the same rotatable member 1 can be utilized to apply pressure in a longitudinal direction to dies for threading pipe in a range of sizes. By way of example, a rotatable member 1 in which the base of the protrusion 5 has a diameter of approximately 2.4 inches can be coupled with dies for threading pipe up to 2 inches in diameter. Moreover, even if the ridged portion 5a should come in contact with the posterior cutting thread of a particular die as the member 1 is being pushed against it prior to a threading operation, there would not subsequently be sufficient relative motion between this member and the cutting edges of the die to cause damage to either.

As is best seen in FIGS. 3 and 4, the rotatable member 1 is held on the shaft 13 by a collar 2 which has a bore 3 that is slightly larger in diameter than is the body 9 of the shaft and by a locking pin 6. A hole 4 in the collar for receiving the pin 6 communicates with the bore 3 and is formed generally perpendicular thereto, being disposed in a plane offset from the longitudinal axis of the collar. A portion of the pin 6 rides in the groove 8 of the shaft 13, thereby holding it and the rotatable member in assembled relation. Friction between the shaft 13 and the member 1 as it rotates thereabout can be minimized, as illustrated in FIGS. 3 and 4, by providing a pointed tip 7 on the shaft 13 with no more than the end of this tip riding against the conically-shaped section 7a of the bore 3. Thus an axial thrust taken by the rotating member 1 is transmitted to the shaft 13 through point contacts only, allowing the member 1 to rotate relatively freely about the shaft 13.

Alternate means of constraining the rotatable member to slide around the shaft is shown in FIG. 5. The rotatable member 51 is similar to the member 1 except that the collar 2 has been eliminated. Instead, a hole 50 for receiving a sleeve 48 formed on the shaft 53 extends from one end of the member 51 to the other. A shoulder 49 is disposed contiguous the sleeve 48 and is at least several thousandths of an inch larger in diameter than the hole 50 in the member 51. A hole 47 with screw threads is formed in the end of the shaft 53 for receiving a screw 46 to retain the member 51 on the shaft. A washer 45 is also provided when the head of the screw 46 is smaller than the hole 50. The length of the sleeve 48 is at least a few thousandths of an inch larger than the thickness of the member 51 along its axis of rotation so that the screw 46 can be tightened without binding.

MODIFICATION

Figure 2:
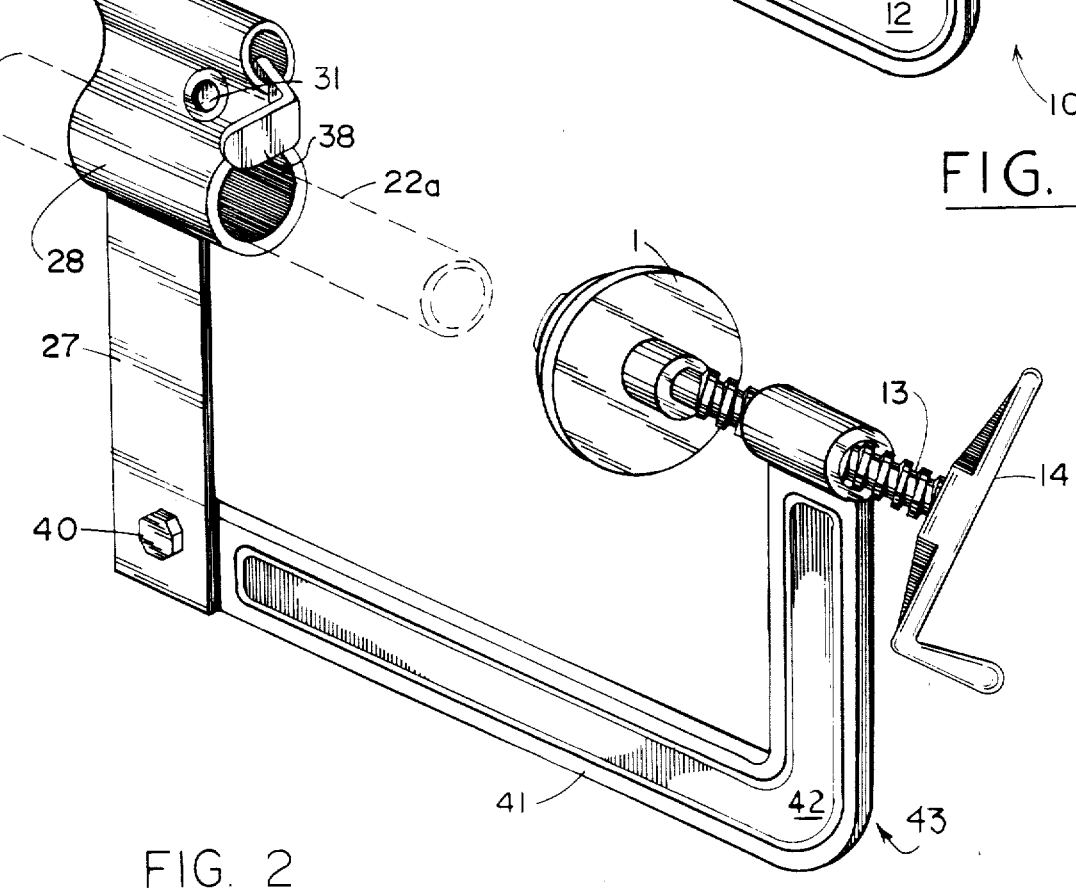
FIG. 2 is a perspective view showing the same tool couple as in FIG. 1 except with a modified frame and base, the base being mountable on the workpiece itself.

In FIG. 1, a preferred embodiment of the present invention was shown and described for clamping a threading die 20 onto the end of a pipe section which is relatively mobile. A different means for anchoring the tailpiece in a fixed position relative to the pipe 22a, as shown in FIG. 2, is provided for those cases in which a system of pipes is being retrofitted and in which it is desirable to cut a section of pipe and to thread the newly-cut end formed therein without disturbing the existing joint between that pipe section and the remainder of the system. For such cases, a tool couple 43 that is anchored to the workpiece itself is provided.

As illustrated in FIGS. 2 and 6, the means for anchoring the tailpiece 27 comprises an open-ended structure 28 which has a vertical slot 29 in which a cam element 30 is pivotally mounted. The structure 28 and the element 30 have holes 32 and 33, respectively, for receiving a pin 31 which holds the structure and the cam element in assembled relation. The pin 31, which is slightly larger than the hole 32, is held in place by a force fit. A biasing means such as the spring 35 in its housing 36 pushes against a bulge 34 on the element 30 causing it to rotate about the pin 31 and bringing the teeth 37 into contact with the pipe 22a. A lever 38, generally bent at right angles to the longitudinal axis of the workpiece and out of the way of the die handle 21, is employed to raise the lobe of the element 30 from which the teeth 37 protrude so that a workpiece may be inserted into the structure 28 or removed therefrom.

As illustrated in FIGS. 1 and 2, the frame 42 is similar to the frame 12 of the tool couple 10. Each has an elongated arm 41, 11, the cross-section of which, outside of its pivotal joint with the tailpiece 27, 17, resembles an I-beam. However, because the means for anchoring the tailpiece 27 in a fixed position relative to the pipe 22a can grip only one size of pipe, only one hole 39 is provided for receiving the bolt 40 which connects the tailpiece 27 and the frame 42.

Although the invention has been described with a certain degree of particularity, it should be understood that the present disclosure has been made by way of example. Consequently, numerous changes in the details of construction and the combination and arrangement of the components as well as the possible modes of utilization, will be apparent to those familiar with the art, and may be resorted to without departing from the spirit and scope of the invention as claimed.

What is claimed is:

1. A tool couple for a threading die, which comprises:
   (a) a frame;
   (b) a tailpiece to which the frame is connected;
   (c) means for anchoring the tailpiece in a fixed position relative to a cylindrical workpiece;
   (d) a shaft supported by the frame;
   (e) means connected to the frame for moving the shaft along the longitudinal axis thereof in a direction toward the workpiece; and
   (f) a rotatable member which is supported by the shaft; a portion of the member being slidable about the shaft; the member having a protrusion generally in the shape of a frustrum of a right circular cone generated by rotating a right triangle having a shorter leg about said shorter leg, a portion of the protrusion being tapered from wide to narrow in a direction toward the leading edge of the rotatable member and being adapted for physical contact with the frame of the threading die, so that a force can be transmitted from the tool couple through the frame of the threading die to points on the cutting edges thereof which are in contact with the workpiece, the axial component of said force at each point on the surface of the protrusion being pressed against the frame of the die exceeding the transverse component of the force at the same point, the transverse component being nevertheless sufficient to cause the rotatable member to center itself generally with the axis of rotation of the die even when there is considerable misalignment between said axis of rotation and the axis of rotation of the rotatable member.

2. A tool couple according to claim 1 which further comprises means for constraining said portion to slide around one end of the shaft, the constraining means comprising:
   (a) the shaft having a projecting sleeve and a groove which circumscribes the sleeve;
   (b) a pin;
   (c) the rotatable member having a bore for receiving the sleeve and at least one hole for receiving the pin; the hole communicating with the bore; a portion of the pin being disposed in said groove.

3. A tool couple according to claim 2 wherein both the tip of the shaft and a section of the bore proximate thereto are characterized as being generally tapered, the surface of the tip being disposed at a smaller angle to the longitudinal axis of the shaft than is the surface of said section, the end of the tip riding against the section, so that the friction from any relative motion of the rotatable member and of the shaft are low.

4. A tool couple according to claim 1 which further comprises means for constraining a portion of the rotatable member to slide around one end of the shaft, the constraining means comprising:
   (a) the shaft having a projecting sleeve and a shoulder contiguous thereto; the sleeve having a hole with screw threads, the longitudinal axes of the hole and of the shaft being generally parallel; and
   (b) a screw which is threadably engaged with the hole in the shaft.

5. A tool couple according to claim 1 which further comprises means for positioning the joint between the frame and the tailpiece so that the longitudinal axis of the shaft is in substantial alignment with the longitudinal axis of the workpiece.

6. A tool couple according to claim 1 wherein the protrusion is further characterized as being generally in the shape of a frustrum of a shallow cone.

7. A tool couple according to claim 1 wherein the protrusion is further characterized as being generally in the shape of a frustrum of a right circular cone generated by rotating a right triangle having a shorter leg which is approximately one half of the hypotenuse in length about said shorter leg.

8. A tool couple according to claim 7 wherein the rotatable member further comprises a ridged portion formed on the narrow end of the protrusion and disposed approximately symmetrically about its axis of rotation to serve as a visual guide in aligning the longitudinal axis of the shaft with the longitudinal axis of the workpiece.

9. A tool couple according to claim 1 wherein the anchoring means further comprises an open-ended structure, the inner surfaces thereof which are adapted to contact the workpiece being of generally cylindrical shape, and means connected to the structure for gripping the workpiece.

10. A tool couple according to claim 9 which further comprises a slot communicating with at least one inner surface and wherein the gripping means further comprises a cam element pivotally mounted on the open-ended structure, an end of the cam element having a cam lobe with teeth which protrude from an edge thereof, the lobe projecting generally toward an open end of the structure, and biasing means urging the cam lobe through the slot and the teeth on the lobe into engagement with the workpiece, so that when the teeth are in contact therewith, any substantial movement of the structure along the workpiece in a direction toward the end-to-be-threaded of the workpiece is prevented.

* * * * *